(12) United States Patent
Pringle et al.

(10) Patent No.: US 6,260,528 B1
(45) Date of Patent: Jul. 17, 2001

(54) METHOD FOR ASSEMBLING AN INTAKE MANIFOLD

(75) Inventors: Hal E. Pringle, Bloomfield; Michael J. Halsig, Warren; David L. Schumacher, Shelby Township; Kevin Beach, St. Clair Shores, all of MI (US)

(73) Assignee: Borg Warner Inc., Troy, MI (US)

( * ) Notice: Subject to any disclaimer, the term of this patent is extended or adjusted under 35 U.S.C. 154(b) by 0 days.

(21) Appl. No.: 09/370,499

(22) Filed: Aug. 9, 1999

Related U.S. Application Data

(62) Division of application No. 08/897,752, filed on Jul. 21, 1997, now Pat. No. 5,992,370.

(51) Int. Cl.[7] .................................................. F02M 35/10
(52) U.S. Cl. ................................ 123/184.55; 123/184.53
(58) Field of Search ........................ 123/184.55, 184.53, 123/184.35, 184.36

(56) References Cited

U.S. PATENT DOCUMENTS

| | | |
|---|---|---|
| 1,941,334 | 12/1933 | Aseltine . |
| 1,966,329 | 7/1934 | Aseltine . |
| 3,282,261 | 11/1966 | Bartholomew . |
| 4,253,432 | 3/1981 | Nohira et al. . |
| 4,254,747 | 3/1981 | Sumiyoshi et al. . |
| 4,256,063 | 3/1981 | Sumiyoshi et al. . |
| 4,262,639 | 4/1981 | Motosugi et al. . |
| 4,308,837 | 1/1982 | Nohira et al. . |
| 4,349,005 | 9/1982 | Gotoh et al. . |
| 4,423,709 | 1/1984 | Arrieta . |

(List continued on next page.)

FOREIGN PATENT DOCUMENTS 196 14 474A1  10/1997 (DE) .
WO96/31692  10/1996 (WO) .

OTHER PUBLICATIONS

European Patent Office, *Patent Abstracts of Japan*, Publication No. 05033679, Publication Date: Feb. 9, 1993—Application No. 03192122, Application Date: Jul. 31, 1991, 1 page.

European Patent Office, *Patent Abstracts of Japan*, Publication No. 02256837, Publication Date: Oct. 17, 1990—Application No. 01012182, Application Date: Jan. 21, 1989, 1 page.

*Primary Examiner*—John Kwon
(74) *Attorney, Agent, or Firm*—Philip R. Warn, Esq.; Greg Dziegielewski

(57) ABSTRACT

A three plenum air distribution manifold for intake air to internal combustion engine with long, narrow runners leading from first and second spaced side plenums for delivery of air and recirculating exhaust gases into corresponding combustion chambers of the engine. One end of the spaced side plenums are connected by an acoustically balanced cross over passage selectively closed by a manifold tuning valve for improving engine output torque during low engine speed. A third plenum is positioned intermediate the two side plenums to communicate with the combustion chambers in bypass relation to the side plenums thereby directly supplying air to the combustion chambers through short runners which are selectively opened by valves to optimize engine torque over a higher range of engine speeds. The manifold tuning valve and short runner valves are controlled by an onboard electronic controller responsive to signals from the engine corresponding to parameters such as engine speed. The short runner valves are connected to a short runner valve shaft, and a biasing assembly applies a load to selected journal locations for the shaft to reduce oscillations of the shaft and the potentially resulting chatter. Further and end-play control assembly limits total endplay to non-uniform expansion or contraction between the plastic manifold and the metal short runner valve shaft and short runner valves.

7 Claims, 7 Drawing Sheets

U.S. PATENT DOCUMENTS

| | | |
|---|---|---|
| 4,502,444 | 3/1985 | Rubbo et al. . |
| 4,553,507 | 11/1985 | Shaffer . |
| 4,579,096 | 4/1986 | Kobayashi et al. . |
| 4,803,961 | 2/1989 | Hiraoka et al. . |
| 4,930,468 | 6/1990 | Stockhausen . |
| 4,945,865 | 8/1990 | Lee . |
| 5,000,129 | 3/1991 | Fukada et al. . |
| 5,005,533 | 4/1991 | Suzuki et al. . |
| 5,056,473 | 10/1991 | Asaki et al. . |
| 5,069,175 | 12/1991 | Simko . |
| 5,211,139 | 5/1993 | Houle et al. . |
| 5,590,628 | 1/1997 | Patyi et al. . |
| 5,632,239 | 5/1997 | Patyi et al. . |
| 5,813,380 | 9/1998 | Takahashi et al. . |
| 5,992,370 | * 11/1999 | Pringle et al. .................. 123/184.55 |

* cited by examiner

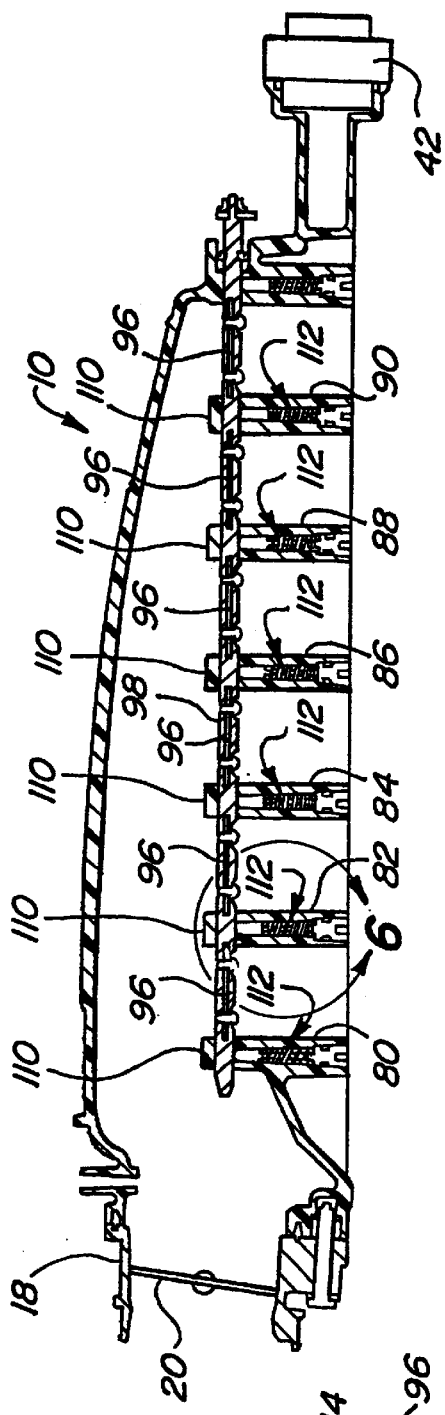
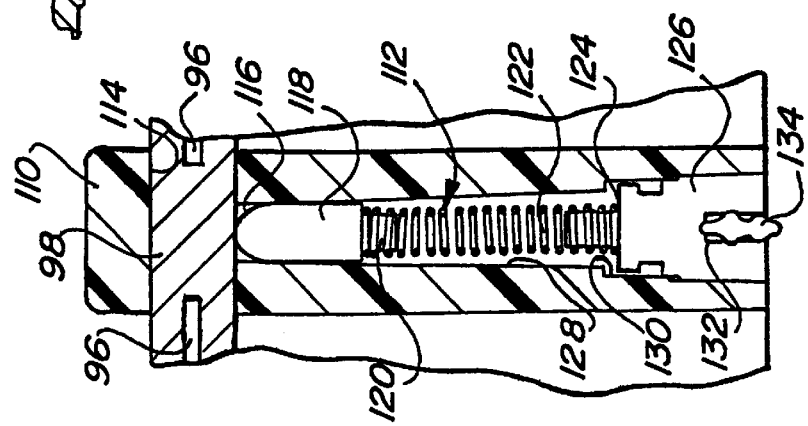
Fig-5
Fig-6

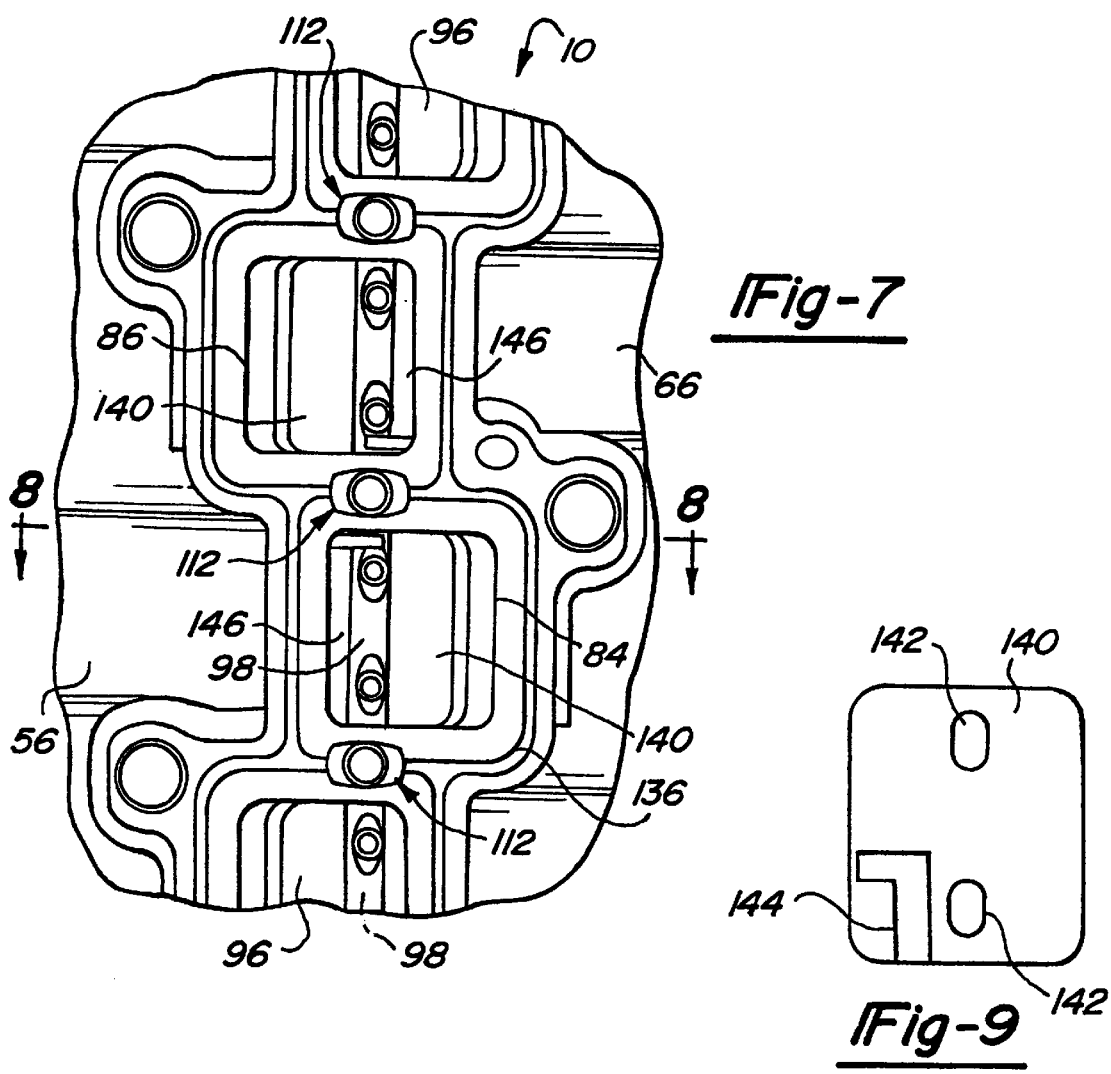
*Fig-7*
*Fig-9*
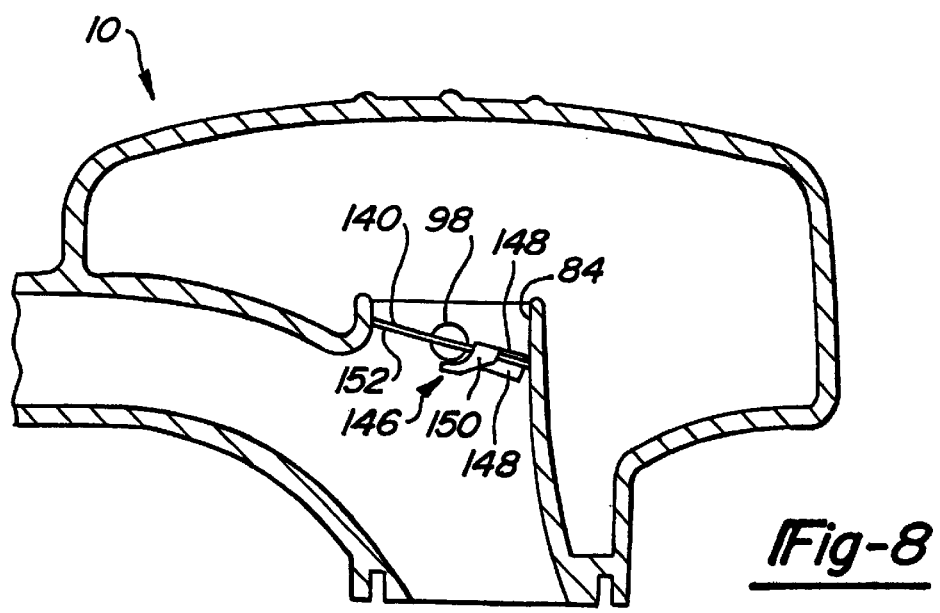
*Fig-8*

METHOD FOR ASSEMBLING AN INTAKE MANIFOLD

This application is a divisional of prior application Ser. No. 08/897,752, filed Jul. 21, 1997, now U.S. Pat. No. 5,992,370, issued Nov. 30, 1989.

TECHNICAL DESCRIPTION

This invention relates generally to intake manifolds for an internal combustion engine and, more particularly, to a new and improved multi-plenum air distributing manifold having a short runner valve for controlling air flow through short runner passages, short runner valve shaft biasing means, and improved endplay control for the short runner valve shaft.

BACKGROUND OF THE INVENTION

U.S. Pat. No. 5,000,129 to Fukada et al., issued Mar. 19, 1991, for "Intake System For Internal Combustion Engine" discloses an air intake system for a V-block engine having a central surge tank disposed above the space between the left and right cylinder banks of the engine. This surge tank is operatively integrated with left and right side surge tanks extending above respective banks of cylinders. A communicating passage disposed between discrete side intake passages connects the central surge tank with the left and right surge tanks so that all of the tanks combine to serve as a single surge tank having a large volume for the suppression of intake air interference.

U.S. Pat. No. 5,133,308, issued Jul. 28, 1992, to Hitomi et al., for "Intake System For Engine" discloses an intake system for a V-block internal combustion engine having a centralized junction chamber and a plurality of discrete intake passages connecting the junction chamber with respective cylinders of the engine. Rotary valves in the intake passages are operated by actuators responding to a controller that receives engine speed signals to close and open the valves for improving engine torque.

U.S. Pat. No. 5,590,629, issued Jan. 7, 1997, to Patyi et al., for "Multi-mode Intake Manifold Assembly for Internal Combustion Engines" discloses a three plenum air distribution manifold for directing intake air into an internal combustion engine with long, narrow runners leading from first and second spaced side plenums for delivery of air and recirculating exhaust gases into corresponding combustion chambers for the engine. A third plenum is positioned intermediate the two side plenums to communicate directly with the combustion chambers, bypassing the side plenums. In this manner, intake air is supplied directly to the combustion chambers through short runners which are selectively opened by valves to optimize engine torque over a higher range of engine speeds. In contrast to the relatively complex structures and operation found in U.S. Pat. Nos. 5,000,129 and 5,133,308 and many prior constructions, U.S. Pat. No. 5,133,308 attempts to provide a straight forward three plenum active air distribution manifold for an internal combustion engine operative to generate improved engine torque over the entire range of engine speeds while simultaneously reducing induction noise and variances in pitch.

Although U.S. Pat. No. 5,133,308 does simplify some of the operating structures of U.S. Pat. Nos. 5,000,129 and 5,133,308, a typical construction typically includes a manifold formed of plastic in which the short runner valves are typically formed of metal. In operation, a differential pressure forms across the short runner valves, causing the short runner valve shaft to oscillate. Oscillation of the shaft within the manifold typically produces an audible echo through the plastic manifold. The echo produced by the oscillation of the short runner valve shaft increases the operating noise of the engine and may be heard by those occupying the passenger compartment of the vehicle. The present invention provides a short runner valve shaft biasing assembly which greatly reduces oscillation of the short runner valve shaft and correspondingly reduces chatter of the short runner valves through the plastic manifold and engine compartment.

As stated above, the manifolds described in U.S. Pat. No. 5,133,308 typically are formed of a plastic material. However, the short runner valves and the short runner valve shaft carrying the short runner valves are typically formed of a metal, such as steel or aluminum. The plastic of the manifold and the metal of the short runner valve assembly typically have significantly differing expansion characteristics in response to changes in temperature and humidity. The short runner valve shaft is assembled into the air distribution manifold to enable a predetermined amount of axial movement or endplay of the shaft with respect to the air distribution manifold. Typically, the endplay is controlled at an end of the air distribution manifold opposite the short runner valve shaft control apparatus. In response to expansion or contraction induced by changes in the heat or humidity, the metal and plastic components expand or contract by varying amounts. Because the endplay control is installed at one end of the shaft, the differing expansion of the metal valve shaft assembly and plastic of the air distribution manifold could cause an interference condition between the short runners and the plates which define the short runner valves. This interference condition could cause binding of the shaft, thereby inhibiting operation of the short runner valves. Thus, in contrast to U.S. Pat. No. 5,133,308, the present invention also provides a short runner valve shaft having multiple endplay controls arranged in intermediate positions along the short runner valve shaft, rather than at the end of the valve shaft.

SUMMARY OF THE INVENTION

This invention is directed to an air intake manifold for an engine having a plurality of cylinders. The air intake manifold includes an air inlet and a central plenum disposed between a pair of side plenums, where air enters the manifold in proximity to the central plenum and is distributed to the side plenums. Long runners conduct air from the side plenums to the cylinders, and short runners conduct air from the central plenum to the cylinders. Short runner valves vary air flow from the central plenum through the short runners and attach to and move in accordance with a valve shaft. The valve shaft is journally supported by the manifold in a plurality of positions along the valve shaft. A valve shaft biasing apparatus biases the valve shaft in proximity to the journal positions in order to reduce radial movement of the valve shaft.

The shaft biasing means further includes a plunger having a partially spherically-shaped head contacting the valve shaft and a spring for biasing the plunger toward the valve shaft. A spring seat is located opposite the plunger from the spring and biases the spring in the direction of the valve shaft. The short runners are separated by walls of the intake manifold, and the wall portions have cavities formed therein to receive the shaft biasing means. In yet another feature of the present invention, selected intermediate short runner valves are formed to include an endplay control device to limit axial movement of the valve shaft.

This invention is also directed to a method for assembling an intake manifold for an engine having a plurality of cylinders, including the following steps. An intake manifold is provided having an air inlet, a central plenum disposed between a pair of side plenums, where air enters the manifold in proximity to the central plenum and is distributed to the side plenums, long runners for conducting air from the side plenums to the cylinders, short runners for conducting air from the central plenum to the cylinders, wherein the short runners are arranged generally longitudinally along the intake manifold and define outer and middle short runners. Further, a valve shaft is provided, and a valve is provided for each short runner to define outer and middle short runner valves corresponding to the respective outer and middle short runners. During assembly, the outer valves are positioned in the respective short runners to set a gap between the valve and the respective short runner, and the outermost valves are attached to the valve shaft. Next, the middle valves for the respective short runners are positioned to set an endplay for the valve shaft, and the middle valves are attached to the valve shaft.

Additional objects, features and advantages of the present invention will become apparent from the following description and the appended claims, taken in connection with the accompanying drawings.

BRIEF DESCRIPTION OF THE DRAWINGS

The drawings, which form an integral part of the specification, are to be read in conjunction therewith, and like reference numerals are employed to designate identical components in the various views:

FIG. 5 is a partial cross-sectional view taken longitudinally along the short runners in order to demonstrate assembly of the short runner valve biasing assembly in operation;

FIG. 6 is an enlarged view of the short runner valve biasing assembly taken along the circle 6 of FIG. 5;

FIG. 7 is a partially cut-away, bottom view of the short runners, showing the endplay control mechanism;

FIG. 8 is a partial, cross-sectional view of an endplay control mechanism as mounted on a short runner valve plate;

FIG. 9 is a short runner valve plate configured to accommodate overmolding of the endplay control mechanism;

DETAILED DESCRIPTION OF THE INVENTION

Figure 1:
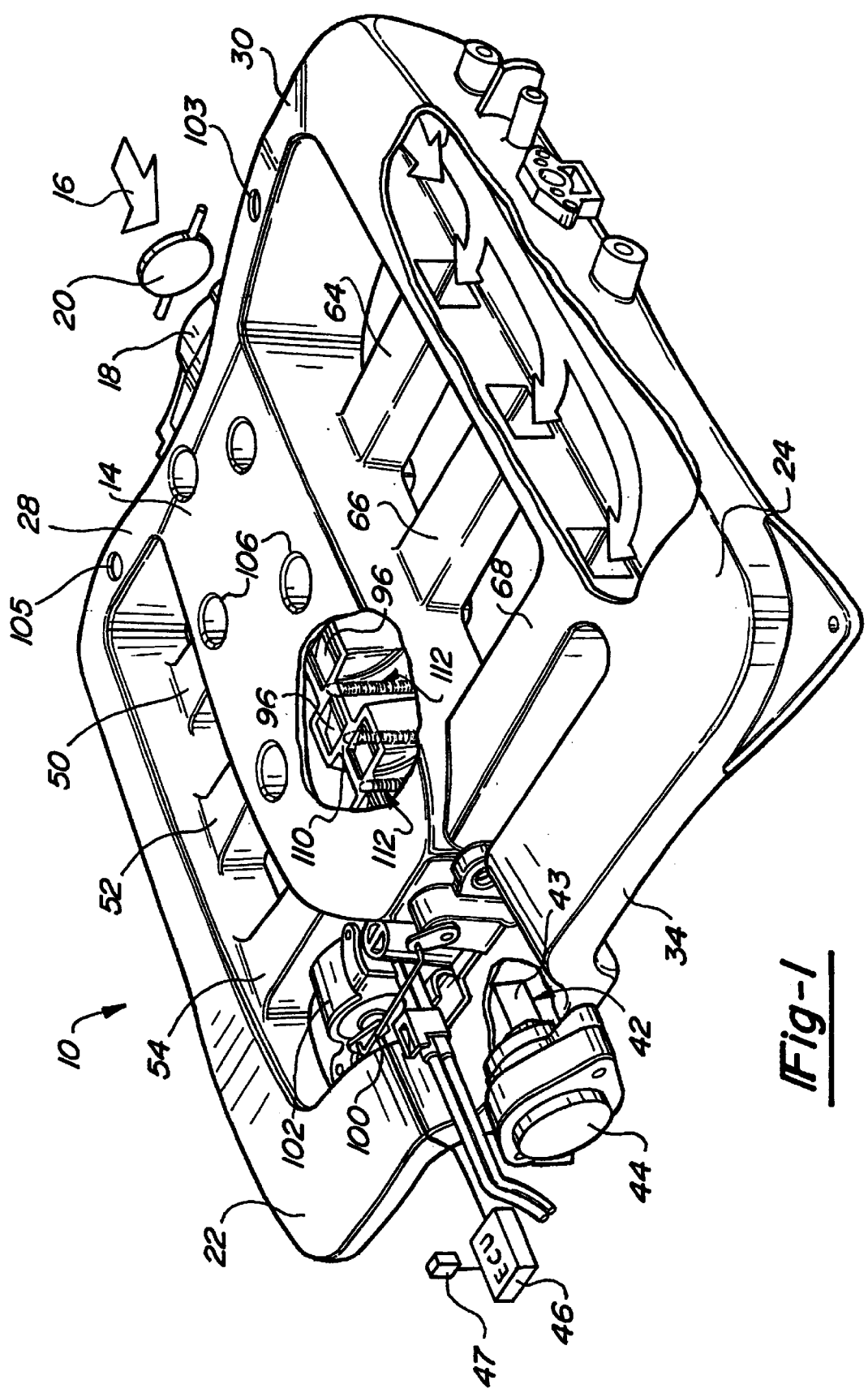
FIG. 1 is a perspective view of a preferred embodiment of the three plenum intake manifold having short runner valve biasing mechanisms and associated control mechanisms to operate the valves, with portions broken away to reveal the short runner valve mechanisms and the air flow paths therein.
Figure 2:
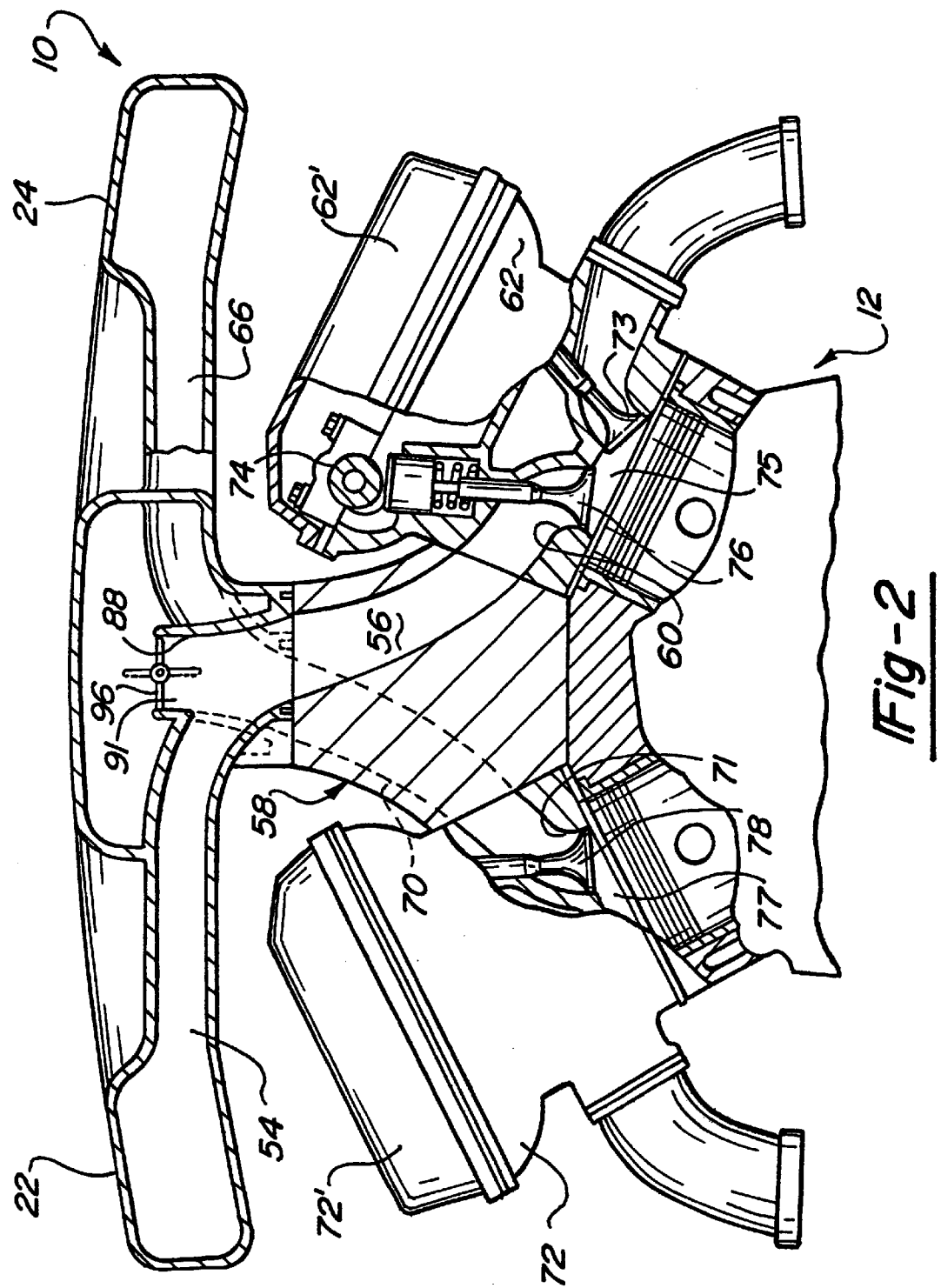
FIG. 2 is an end elevational view from the front portion of an associated engine of the subject manifold with partial sectioning to reveal passages therein and various engine parts.

Turning now to FIGS. 1 and 2, a three plenum air intake manifold 10 for a V-type six cylinder internal combustion engine 12 is illustrated. The manifold 10 is fully active to provide multiple tuning peaks which peaks are effective at different engine speed ranges to optimize engine torque.

The manifold 10 has a centralized axially extending central plenum 14 into which a flow of air 16 is feed through a throttle body 18. Throttle body 18 houses a conventional throttle valve plate 20 which is shown diagrammatically separated from the throttle body 18 but in reality is operatively mounted therein in a manner allowing it to be pivoted so as to control air flow into the manifold.

In addition to the central plenum 14, the manifold has a pair of side plenums 22 and 24 which are fluidly connected to the central plenum 14 and the inlet through the throttle body 18. More particularly, side plenums 22 and 24 are connected to one another at one end of the manifold adjacent the throttle body by transversely extending zip tubes 28, 30. The two side plenums 22 and 24 are also connected to one another at an opposite end of the manifold by laterally extending crossover passage 34.

As best shown in FIG. 1, flow through the cross over passage 34 is regulated by a manifold tuning valve (MTV) 42 which is mounted at a mid-position in the passage 34. The MTV 42 has a valve or MTV plate 43 which is selectively positioned between opened and closed positions by an actuator. The actuator may be a piston which is powered by fluid pressure. In the preferred embodiment shown in FIG. 1, the actuator is in the form of an electric motor 44 which is selectively controlled by an electronic control unit (ECU) 46 which is part of the onboard engine control system of the vehicle. ECU 46 receives input signals from sensors, such as an engine speed or rpm sensor 47, to control operation of motor 44 as well as other motors or actuators which will be described hereafter.

Figure 3:
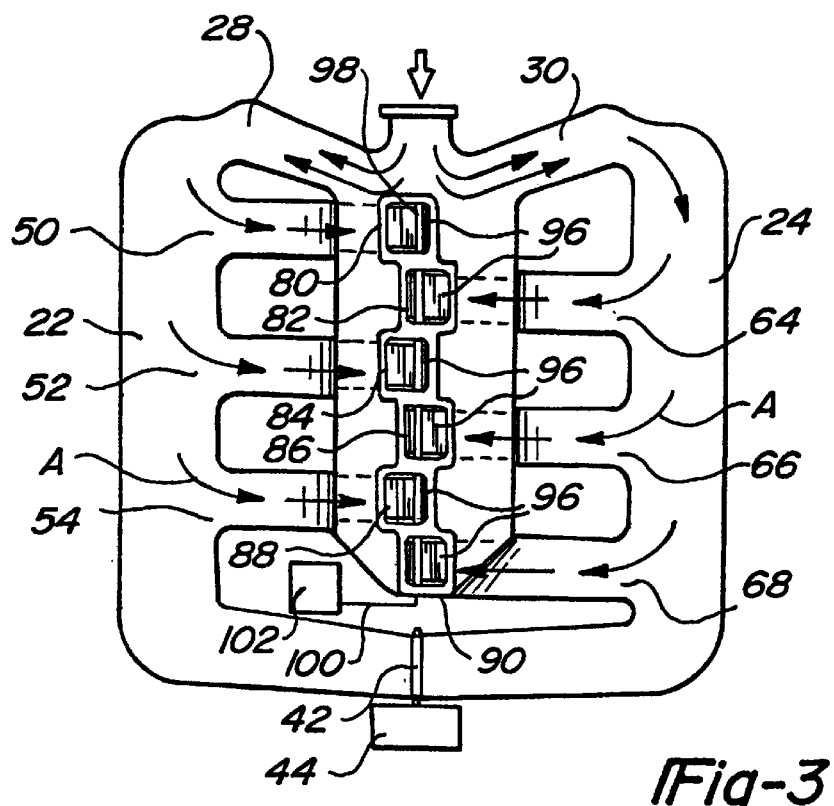
FIG. 3 is top planar view of the subject manifold shown somewhat schematically and broken away to illustrate air flow paths therethrough when in one mode of operation.

As shown in FIGS. 1 and 3, the left side plenum 22 is connected to the three cylinders in the right hand cylinder bank of the engine 12 by long runners 50, 52 and 54. Referring now to FIG. 2, one of the runners 54 is shown extending between plenum 22 and an intake passage 56 which is formed in a cylinder head manifold 58. The intake passage 56 extends to an intake port 60 of cylinder head 62 to permit air to flow into one of the engine's combustion chambers 75.

Referring back to FIGS. 1 and 3, the right side plenum 24 is connected to the three cylinders of the left hand bank by long runners 64, 66 and 68. Specifically, one of the long runner passages 66 from plenum 24 is shown in FIG. 2. Air passes from plenum 24, through passage 66 to connect with passage 70 in the cylinder head manifold 58 and then to intake port 71 of the left cylinder head 72 and into combustion chamber 77.

Looking to FIG. 2, both right and left banks (sides) of the engine are similar. More particularly, the respective right and left cylinder heads 62, 72 support conventional camshafts which operate intake valves which control air flow into the combustion chambers. The camshaft 74 of cylinder head 62 is operably connected to intake valve 76 and another camshaft (not visible) associated with cylinder head 72 is operably connected to intake valve 78. Intake valves 76, 78 are opened to control flow of air and fuel into respective combustion chambers 75 and 77. By closing the valves 76, 78 the combustion chambers are sealed during the combustion event.

Additionally, cylinder heads 62, 72 support exhaust valves associate with each combustion chamber. For example, an exhaust valve 73 is shown associated with combustion chamber 75. Exhaust camshafts (not visible) are supported by cylinder heads 62, 72 to operate the exhaust valves. The cylinder heads 62, 72 support valve covers 62', 72' which extend over the camshafts.

Figure 4:
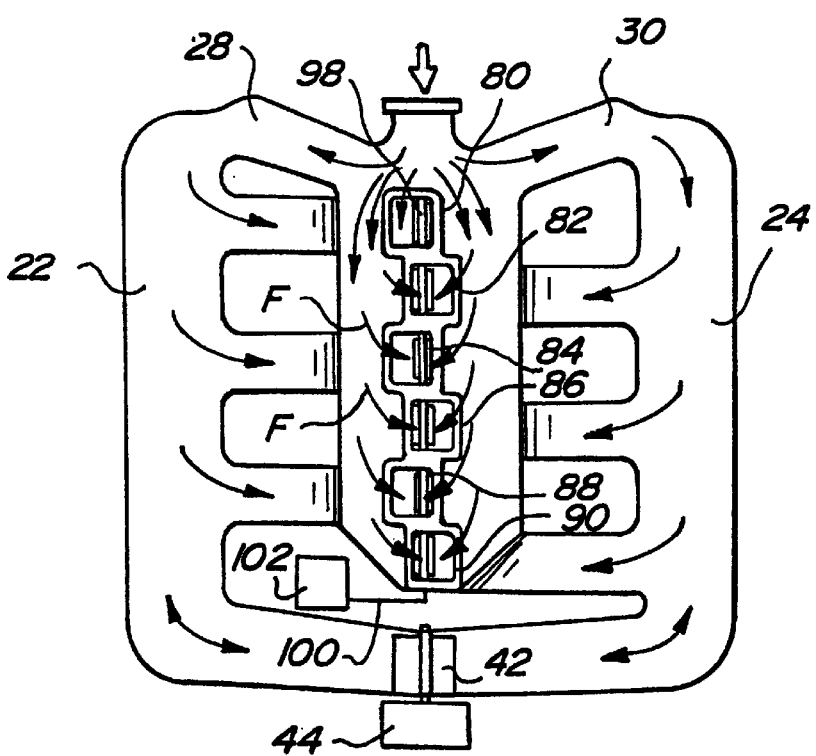
FIG. 4 is view similar to FIG. 3 but illustrating air flow paths through the subject manifold when in a second mode of operation.

Referring now to FIGS. 3 and 4, the central plenum 14 is shown with six short runners 80, 82, 84, 86, 88 and 90. Each short runner is directly connected to the passages in cylinder head manifold 58, as best seen in FIG. 2 with relation to runner 88 and passage 56. Accordingly, short runners 80, 82, 84, 86, 88, and 90 directly feed air to corresponding passages in cylinder head manifold 58 from central plenum 14. Specifically, in FIG. 2, the passage 91 of short runner 88 connects plenum 14 to passage 56 to flow air through intake port 60 and into combustion chamber 75.

The air flow through each of the short runners is controlled by a short runner valve (SRV) 96 as seen in FIGS. 3, 4 (closed and opened respectively). In FIG. 2, one of the short runner valves 96 is shown operatively mounted in one of the short runners 88 and located upstream of its intersection with the passage 56 in cylinder head manifold 58. Each of the valves 96 are butterfly-type plate valves attached to a common shaft 98. Shaft 98 is supported for rotation by the manifold 10 and extends through the central plenum 14 at the entrance to the short runners 80–90. The shaft 98 can be rotated so that the valves 96 are moved to closed positions as shown in solid line in FIG. 1 and also in FIG. 3. In the closed position, flow through the short runners 80–90 is blocked. Resultantly, air flow to the combustion chambers is through: the throttle body 18; zip tubes 28, 30; left and right plenums 22, 24; long runners 50, 52, 54, 64, 66, and 68; and connecting passages in the air distribution manifold 58. This operative mode for the intake system is advantageous for idle and low speed operation of the engine.

As shown in FIG. 1, a crank arm 99 attached to the end of shaft 98 is engaged by a linkage 100 to operably connect shaft 98 to a pneumatically powered motor 102. The pneumatic power to motor 102 is controlled by the ECU 46. Upon receiving an appropriate signal from a sensor, such as engine speed sensor 47, the ECU 46 directs power to the motor 102 for arranging the SRVs 96 in their closed positions for improved low speed operation and in their opened positions for improved high speed operation. More specifically, when the SRVs 96 are closed as shown in FIG. 3, air flow into the short runner passages 80–90 is blocked. This causes air to flow to the left side combustion chambers 77 through the long runners 64, 66, 68 from the right hand plenum 24. Similarly, air flow to the right side combustion chambers 75 is routed through the long runners 50, 52, 54 from the left side plenum 22. When high engine speeds are sensed by sensor 47, the signal to the ECU 46 activates motor 102 to open the SRVs 96 as shown in FIG. 3. This improves air flow and increases engine performance by the addition of more direct flow paths to the combustion chambers.

In operation, under an engine idle condition, the ECU 46 directs motor 44 of the manifold tuning valve (MTV) 42 to position the MTV plate 43 to a fully closed position in the crossover passage 34 shown in FIG. 1. Accordingly, crossover passage 34 is blocked. ECU 46 also controls actuation of motor 102 so as to maintain the SRVs 96 in closed positions. With the MTV closed, pressure waves formed in the side plenums 22, 24 are not balanced acoustically by passage through crossover passage 34. However, waves formed in the side plenums 22, 24 act independently to produce desirable enhanced air flows as more specifically described below.

During an engine idle condition, the valves of both the MTV 42 and the SRVs 96 are closed as shown in FIGS. 1 and 3. Air for the engine enters the manifold through the throttle body 18, and the flow volume is controlled by the positioning of the throttle valve plate 20 by the vehicle operator through the vehicle's accelerator pedal. Because SRVs 96 are closed, air flows from the throttle body to the combustion chambers through the zip tubes 28 and 30, into the two side plenums 22 and 24, and then through long runner passages 50, 52, 54 or 64, 66 and 68 to corresponding continuing passages in the cylinder head manifold 58 to the intake ports formed in the two cylinder heads 62, 72 of the engine. When desired, small volumes of exhaust gas is added to the air flow (or recirculated) through intake ports 103 and 105 formed in the zip tubes 28 and 30. Whenever an engine intake valve is opened, air and any recirculated exhaust flows into an associated combustion chamber.

With crossover passage 34 blocked by a closed MTV 42 as shown in FIG. 1 and 3, pressure waves are generated in both side plenums 22, 24. These waves formed are normally of about the same frequency and amplitude in either plenum. The waves rebound from the closed MTV 42 to cause increases in air density which enhance air flow into the long runners 50, 52, 54 and 64, 66, 68 at lower engine speeds of below 3600 rpm, for example. The air flow into the long runners is represented by flow arrows A in FIG. 3. During an intermediate engine speed, the engine torque is significantly increased by maintaining the MTV 42 and SRV 96 closed as the air flow through the long runners is enhanced.

At higher intermediate engine speeds, for example of over about 3600 rpm, a torque benefit can be obtained by opening MTV 42 while the SRVs 96 are maintained in closed positions. During a higher engine speed range, for example of over about 5000 rpm, the torque characteristics of the engine benefit by closing the MTV 42 and opening the SRVs 96. With SRVs 96 opened, air still can flow through the long runners 50, 52, 54, 64, 66, and 68, but an additional and more direct path is opened extending from the central plenum 14 directly into the short runners 80–90 as identified by flow arrows F in FIG. 4. By adding flow paths through the short runners 80–90, the total manifold tuning characteristic is changed resulting in a much greater air flow capacity. The resultant increase in air flow capacity generates increased torque over the higher speed range.

While benefits of both the MTV and SRV systems are described and shown as occurring during certain engine speed ranges, there are other ranges and conditions which can benefit from differing intake manifold and valving configurations and combinations. Accordingly, for different internal combustion engine configurations and for different engine speed ranges, the subject intake manifold system can take different tuning characteristics to provide desired torque benefits derived from different SRV and MTV valving operations. Resultantly, by varying operation of the MTV and SRV systems, engine torque can be optimized for a number of different engines operating over a wide range of speeds.

Also, with the subject manifold system, under hood packaging is improved so that additional hood streamlining is possible. Specifically, the subject manifold provides a compact and low profile engine package created because the basic configuration and size of each runner and each plenum is essentially in a common plane and is elongated in a generally horizontal plane. Note in FIG. 1 that this manifold has shallow openings 106 for receiving fasteners (not shown) to attach the manifold to the cylinder head manifold 58. Also, access to fuel injectors (not shown) through the spaces between long runners 50, 52, 54 and 64, 66, and 68 located outward from the central plenum 14.

In addition to the enhanced torque characteristics previously explained, a valuable contribution of this manifold with the MTV and SRV systems is an opportunity to decrease induction noise of the engine. It is particularly desirable to reduce noise during engine idle and during a lower speed range of engine operation. Under these conditions, the escape of pressure waves from the side plenums 22, 24 to the atmosphere through the throttle body 18 is greatly inhibited by the geometry of the manifold. The multiple turns in the path between the interiors of plenums 22, 24 to the zip tubes 28, 30 and from the zip tubes 28, 30 into the throttle body 18 help to decrease emission of noise through the throttle body and out to the atmosphere. The intersection of the zip tubes 28, 30 at a substantially right angle to the throttle body 18 aids in cancellation of some pressure waves generated in the side plenums 22, 24. When pressure waves interact together at the point of intersection adjacent the throttle body, cancellation occurs. Resultantly, noise emission is decreased. Any small volumes of noise exiting the throttle body are easily canceled using simple conventionally passive devices. With the aforedescribed noise cancellation effects, back pressure of the induction system is reduced and engine performance and fuel economy are enhanced.

In addition to reducing the induction noise of the engine, the present invention also reduces induction noise related to oscillations of the short runner valve shaft 98. In particular, a pressure differential often forms across the SRVs 96, causing the SRV shaft 98 to oscillate. This oscillation causes the SRVs 96 to chatter against their respective short runners 80–90. This chatter may echo throughout the manifold 10 and surrounding engine compartment. The present invention reduces chatter by providing a shaft biasing mechanism which applies a load to the SRV shaft 98 to bias the shaft in its respective journal. Referring to FIGS. 5 and 6, a longitudinal cross-section taken along the SRV shaft 98 of the manifold 10 is shown in FIG. 5. The short runners 80–90 are arranged generally adjacently along SRV shaft 98. Each short runner 80–90 is bounded by a side wall 110 which also journally supports the shaft 98. In each sidewall 110 beneath the SRV shaft 98, a shaft biasing assembly 112 biases the SRV shaft 98 in its respective journal by applying an upward load on the shaft.

The upward load is applied to the SRV shaft 98 by a partially, spherically-shaped tip 116 of a plunger 118. The plunger 118 includes a spring seat 120 which receives a compression spring 122. At its other end, the compression spring is seated upon a spring seat 124 of a stuffer 126. The shaft biasing assembly 112 is inserted into a cavity 128 of each respective sidewall 110. The cavity 128 also includes an enlarged section 130 which receives the stuffer 126. The stuffer 126 is located on top of the seal track 136 of FIG. 7, and includes a groove 132 which receives a manifold seal 134. The manifold seal 134 engages both the groove 132 and the seal track 136, thereby providing a fluid seal between the cylinder head manifold 58 and manifold 10. The stuffer 126 is held in place over the seal track when the manifold 10 is mounted to the cylinder head manifold 58. With reference to FIG. 1, the shaft biasing assembly 112 can be shown in operation position through a cut-away between a pair of short runners. The shaft biasing assembly 112 prevents and limits oscillations of the SRV shaft 98 caused by pressure pulsations within the intake system by applying an upward force onto the shaft where it is journalled in the sidewall 110.

This invention also advantageously provides an endplay control feature. Referring to FIGS. 7–9, a partial, bottom plan view of the intake manifold 10 is shown in FIG. 7. This partial view corresponds to short runners 84 and 86, which are the center two of the runners 80–90. For short runners 84 and 86, the SRV 140 differ than the SRV 96 for the other short runners. In particular, in addition to apertures 142 to accommodate screws for connection of the SRVs 96 and 140 to SRV shaft 98, the SRV 140 also includes a cutout 144. The cutout 144 accommodates an endplay control device 146. The endplay control device 146 is typically formed of plastic and is overmolded to the SRV 140. The endplay control device 146 includes a base 148 which is molded around SRV 140. Endplay control device 146 also includes a finger 150 extending from the base 140 and has a radius formed in accordance with the circumference of SRV shaft 98.

In operation, the SRV shaft 98 and SRV valve 140 substantially reduce endplay relative to both ends of the SRV shaft 98. In particular, the endplay control device 146 accounts for the differential expansion and contraction between the housing section of the manifold 10 and the SRV shaft assembly as a result of humidity and temperature exposure. In particular, by moving the endplay control device 146 toward the middle of the SRV shaft 98, the tolerance between the SRV 96 and the short runners, particularly short runners 80 and 90, may be reduced by approximately one half. Further, by moving the endplay control device 146 towards the middle of the shaft, the endplay control devices better compensate for relative growth of the manifold 10 than when located at the ends of the SRV shaft 98. Resultantly, this enables decreasing the clearance between the short runners 80–90 and the SRVs 96. Further yet, as shown in FIG. 8, because the finger 150 of the endplay control device overlaps the edge 152 of SRV 140, the side of the finger provides a wear surface thereby reducing the opportunity for the SRV shaft 98 to bind.

Figure 10:
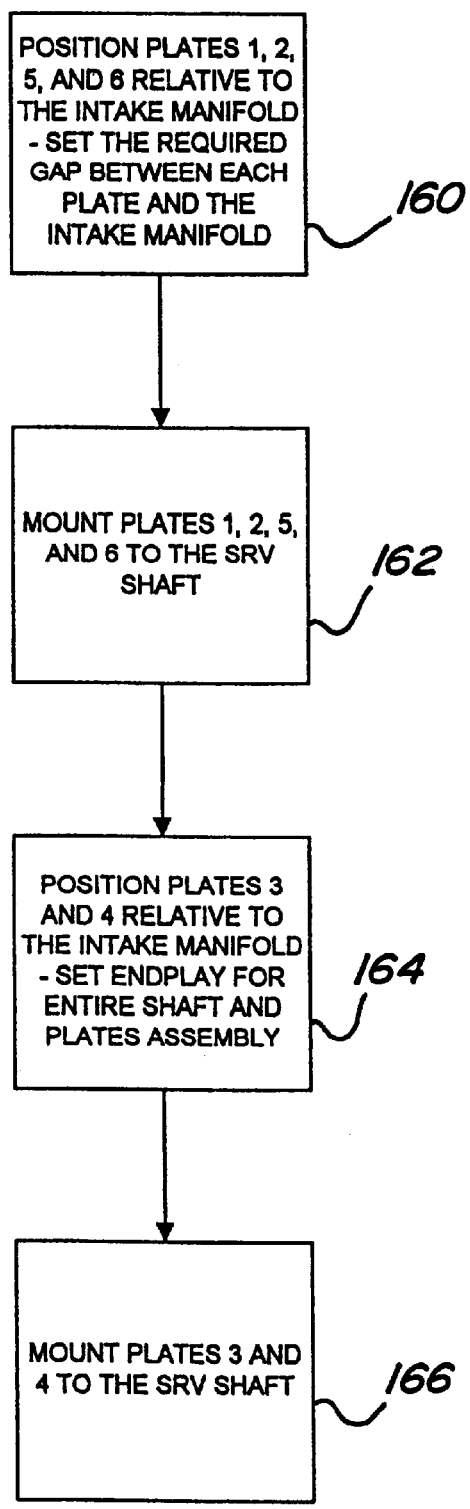
FIG. 10 is a flow diagram for a generalized approach for assembling the end plates in order to set the endplay.

FIG. 10 is a simplified flow diagram for a process for attaching the SRVs 96 to the SRV shaft 98 in order to set the required amount of gap between the SRVs 96 and the intake manifold 10. In the following flow diagrams, the SRVs or plates 96 are referred to sequentially as plates 1 through 6 and correspond to short runners 80–90, respectively. That is, plate 1 is associated with short runner 80, plate 2 is associated with 82, plate 3 is associated with short runner 84, plate 4 is associated with short runner 86, plate 5 is associated with short runner 88, and plate 6 is associated with short runner 90. Referring to FIG. 10, the process of assembling the plates to the short runner valve shaft commences at block 160. At block 160, plates 1, 2, 5, and 6, the two upper and lower SRVs, are positioned relative to the intake manifold. During this step, the required gap between each plate in the intake manifold is set. Plates 1, 2, 5, and 6 are then attached to the SRV shaft as shown at block 162. As shown at block 164, plates 3 and 4, the intermediate pair of plates, are positioned relative to the intake manifold, and the endplay is set for the entire shaft and plates assembly. Plates 3 and 4 are then attached to the SRV shaft as shown at block 166. The foregoing process ensures that a minimum gap between each plate in the intake manifold is maintained in order to account for the relative expansion or contraction of the components resulting from exposure to humidity and temperature.

Figure 11:
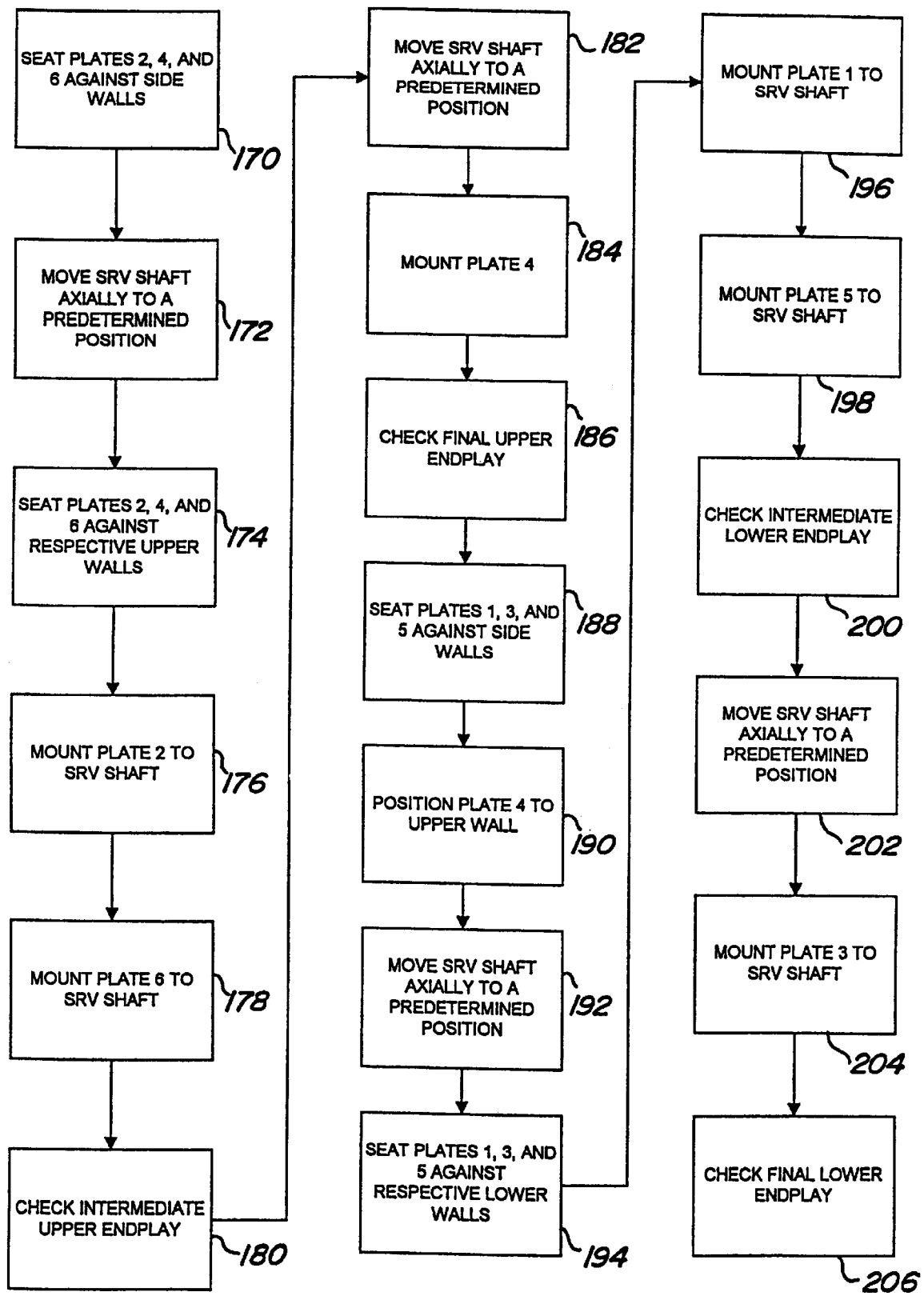
FIG. 11 is a detailed flow diagram for a process for mounting end plates in order to set the endplay for the entirety of the shaft and plates assembly.

FIG. 11 presents a more detailed flow diagram of an assembly process, but based on the same desirable approach to minimizing the gap between each plate 96 and the intake manifold 10. In FIG. 11, the plates are referred to as 1 through 6 as in FIG. 10. Further, the flow diagram of FIG. 11 refers to positioning of the plates with respect to the walls of the respective short runner with which that plate is associated. In FIG. 11, the term sidewall refers to the left and right sides of a respective short runner when manifold 10 is oriented as shown in FIGS. 3 and 4. Similarly, the term upper refers to the top wall of a respective short runner when manifold 10 is oriented as shown in FIGS. 3 and 4, and the term lower similarly refers to the lower wall of the short runners.

In FIG. 11, the process of mounting the plates to the SRV shaft commences at step 170 in which all plates 96 are seated against the respective sidewalls. The SRV shaft 98 is then located at a predetermined position axially as shown at block 172. After the SRV shaft 98 is located at a predetermined position, plates 2, 4, and 6 are seated against the upper walls of the respective short runners, as shown at block 174. After plates 2, 4, and 6 are seated, plate 2 is then mounted to the SRV shaft 98 as shown at block 176, and plate 6 is then mounted to the SRV shaft as shown at block 178. The intermediate endplay of the SRV shaft is then checked at block 180. If the intermediate endplay is acceptable, the SRV shaft if then repositioned axially to a predetermined position as shown at block 182, and plate 4 is then mounted to SRV shaft as shown at block 184. A final check of the upper endplay is then performed at block 186.

A similar process is then repeated for plates 1, 3, and 5 in order to set the lower endplay of the SRV shaft. In particular, at block 188, plates 1, 3, and 5 are seated against the sidewalls of their respective short runners. At block 190, the SRV shaft is moved downward to set plate 4 off from the upper wall to a predetermined axial position as shown at block 192. Plates 1, 3, and 5 are then seated against the lower walls of the respective short runners shown at block 194, and plate 1 is mounted to the SRV shaft as shown at block 196, and plate 5 is mounted to the SRV shaft as shown at block 198. At block 200, the intermediate lower endplay is then checked to determine if it is within acceptable limits. The SRV shaft 98 is then axially displaced to a predetermined position axially as shown at block 202, and plate 3 is then mounted to the SRV shaft as shown at block 204. To complete the process, a check of the final lower endplay is performed at block 206.

While this invention has been disclosed in connection with a particular example thereof, no limitation is intended thereby except as defined in the following claims. This is because a skilled practitioner recognizes that other modifications can be made without departing from the spirit of this invention after studying the specification and drawings.

What is claimed is:

1. A method for assembling an intake manifold for an engine having a plurality of cylinders, comprising the steps of:

providing an intake manifold having an air inlet, a central plenum disposed between a pair of side plenums, where air enters the manifold in proximity to the central plenum and is distributed to the side plenums, long runners for conducting air from the side plenums to the cylinders, short runners for conducting air from the central plenum to the cylinders, wherein the short runners are arranged generally longitudinally along the intake manifold and define at least one longitudinally outer short runner and at least a middle short runner inboard from said outer short runner;

providing a valve shaft;

providing a valve for each short runner to define outer and middle short runner valves corresponding to the respective outer and middle short runners;

positioning said at least one outer valve in the respective short runner to set a gap between the valve and the respective short runner;

attaching the said at least one outer valve to the valve shaft;

positioning said at least one middle valve in the respective short runner to set an endplay for the valve shaft; and attaching said at least one middle valve to the valve shaft.

2. The method of claim 1, further comprising the steps of:

positioning any outer remaining valves in the respective short runners when positioning the at least one outer valve to set a gap between the valve and the respective short runner;

attaching the remaining outer valves to the valve shaft;

positioning any remaining middle valves in the respective short runners when positioning the at lest one middle valve to set an endplay for the valve shaft; and attaching the remaining middle valves to the valve shaft.

3. The method of claim 2 wherein the engine has six cylinders and the intake manifold has six short runners arranged generally longitudinally along the intake manifold, and six valves each associated with a respective short runner, the short runners and the respective valves being referred to sequentially as short runners and valves 1, 2, 3, 4, 5, and 6, wherein valves 1, 2, 5, and 6 are outer valves and valves 3 and 4 are middle valves.

4. A method for assembling an intake manifold for an engine having a plurality of cylinders, comprising the steps of:

providing an intake manifold having an air inlet, a central plenum disposed between a pair of side plenums, where air enters the manifold in proximity to the central plenum and is distributed to the side plenums, long runners for conducting air from the side plenums to the cylinders, short runners for conducting air from the central plenum to the cylinders, wherein the short runners are arranged generally longitudinally along the intake manifold, wherein one group of non-adjacent short runners are defined as a first set of short runners and another group of non-adjacent short runners is defined as a second set of short runners, and further wherein each first and second short runner set has at least one outer short runner adjacent to an end of said manifold and at least a middle short runner spaced Inboard from said outer short runner;

providing a valve shaft;

providing a valve for each short runner to define first and second sets of valves, each set of valves having outer valves and a middle valve, corresponding to the respective first and second sets of runners and the outer and middle short runners for each set;

attaching said at least one outer valve from one of the sets selected from the group consisting of said first and second sets to the valve shaft;

attaching said at least one middle valve of said one set to the valve shaft, attaching said at least one outer valve of the other of said first and second sets to the valve shaft; and attaching said at least one outer valve of the other of the first and second sets to the valve shaft; and attaching at least one middle valve of the other set selected from the group consisting of said first set and said second set to the valve shaft.

5. The method of claim 4 further comprising the steps of:

attaching the outer valves of one of the first or second sets to the valve shaft when attaching the at least one outer valve;

attaching the middle valve of the one set to the valve shaft when attaching the at least one middle valve;

attaching the outer valves of the other of the first or second sets to the valve shaft when attaching the at least one outer valve; and attaching the middle valve of the other set to the valve shaft when attaching the at least one middle valve.

6. The method of claim 4 wherein one of the first or second sets of valves is attached to the valve shaft to determine endplay in a first axial direction of the valve shaft, and the other of the first or second set of valves is attached to the valve shaft to determine endplay in a second axial direction of the valve shaft.

7. The method of claim 5 wherein the engine has six cylinders and the intake manifold has six short runners arranged generally longitudinally along the intake manifold, and six valves each associated with a respective short runner, the short runners and the respective valves being referred to sequentially as short runners and valves 1, 2, 3, 4, 5, and 6, wherein valves 1, 3, and 5 define one of the first or second sets of valves and further wherein valves 1 and 5 define outer valves of the set and valve 3 defines the middle valve, and wherein valves 2, 4, and 6 define the other of the first or second sets of valves and further wherein valves 2 and 6 define outer valves of the set and valve 4 defines the middle valve.

* * * * *

UNITED STATES PATENT AND TRADEMARK OFFICE
CERTIFICATE OF CORRECTION

PATENT NO. : 6,260,528 B1
DATED : July 17, 2001
INVENTOR(S) : Hal E. Pringle et al.

It is certified that error appears in the above-identified patent and that said Letters Patent is hereby corrected as shown below:

Title page,
Item [57], ABSTRACT,
Line 21, "Further and" should be -- Further, an --.

Column 1,
Line 6, "1989." should be -- 1999. --.

Column 3,
Line 40, "is top" should be -- is a top --.
Line 43, "is view" should be -- is a view --.

Column 4,
Line 5, "feed" should be -- fed --.
Line 65, "associate" should be -- associated --.

Column 6,
Line 26, "SRV" should be -- SRVs --.

Column 8,
Line 3, "differ than the SRV 96" should be -- differs from the SRVs 96 --.

Column 9,
Line 19, "if" should be -- is --.

Column 10,
Line 13, "lest" should be -- least --.
Line 42, "Inboard" should be -- inboard --.
Line 53, "shaft," should be -- shaft; --.

UNITED STATES PATENT AND TRADEMARK OFFICE
CERTIFICATE OF CORRECTION

PATENT NO.     : 6,260,528 B1
DATED          : July 17, 2001
INVENTOR(S)    : Hal E. Pringle et al.

It is certified that error appears in the above-identified patent and that said Letters Patent is hereby corrected as shown below:

<u>Column 10 (cont'd),</u>
Line 55, delete "and".

Signed and Sealed this

Thirtieth Day of December, 2003

JAMES E. ROGAN
*Director of the United States Patent and Trademark Office*